3,525,708
FIRE RETARDANT POLYURETHANE COATING COMPOSITIONS

Charles C. Clark, Kenmore, and Arthur J. Krawczyk, Cheektowaga, N.Y., assignors to Textron Inc., a corporation of Delaware
No Drawing. Filed Aug. 9, 1965, Ser. No. 478,410
Int. Cl. C08f 45/58
U.S. Cl. 260—45.85    28 Claims

ABSTRACT OF THE DISCLOSURE

Polyurethane-type, fire retardant coating compositions are made from an aromatic diisocyanate, a phenoxy ether diol, especially containing 3 to 5 chlorine atoms on the phenyl group, and a polyhydroxy aliphatic phosphate or phosphonate. The compositions have excess isocyanate groups, are moisture-curing, and are especially useful as coating compositions exhibiting intumescent properties. The desired characteristics of the compositions can be improved by the addition of a haloalkyl phosphate along with, if desired, an alkylene diamine tetraacetic acid. Representative reactants are tolylene diisocyanate, pentachlorophenoxy glyceryl ether and di(polyoxypropylene butyl phosphate, or O,O-diethyl-N,N-bis(2-hydroxyethyl) aminomethyl phosphonate.

---

This invention relates to fire retardant coating compositions. More particularly, the present invention is concerned with fire retardant coating compositions made by reaction of an aromatic diisocyanate, a phenoxy ether diol and a polyhydroxy aliphatic ester of phosphorus as essential ingredients. In one specific and preferred embodiment the coating composition contains a haloalkyl phosphate and the properties of the product may be even further enhanced by including an alkylene diamine tetra acetic acid. Coatings produced from the compositions of this invention are moisture-curing due to the presence of isocyanate groups and the coating is especially distinguished by its intumescent properties.

The importance of imparting fire retardant characteristics to building materials and other substrates of the flammable type is widely recognized. By and large it is not practical, even if possible, to make flammable building materials completely fire resistant. However, it is very desirable to give to such materials sufficient fire retardant properties to delay the spread of fire to allow the escape of occupants from burning structures and to give time for firemen to arrive on the scene to take action before the structure is consumed and the fire transferred to nearby buildings and equipment. A most convenient manner of imparting such characteristics to the building materials is to coat them with a liquid which will cure or dry to a more or less hard film in the presence of the moisture in the atmosphere. These coating materials often have as a principal ingredient a base which is referred to as a moisture-curing vehicle. Such products are applied to plywood and other types of panelling and combustible materials used in forming walls and other structures in commercial and domestic buildings.

A procedure for evaluating the fire retardant properties of building materials can be readily applied in the ordinary laboratory. This operation employs a small metal cabinet described in ASTM-D-1360 found in ASTM, Part 21, January 1965, Fire Retardancy of Paints (Cabinet Method), the cabinet having a glass door for observing burning in the cabinet. The cabinet also has holes around its bottom for air draft with a chimney serving as a smoke outlet. A 12" x 6" x ¼" wood panel, for instance, poplar or even birch plywood for a more rigorous test, is covered with the coating to be tested and then the coating is allowed to dry or cure for at least about 2 days. Two or three coats may be applied and three coats give good film thickness for an adequate determination of fire retardance and intumescence. The coated panel is placed on a metal frame at a 45° angle in the test cabinet. A measured amount of ethanol, for instance, 1 cc. or even 5 ccs. for a more severe test, is placed in a small iron cup below the panel, so that when the ethanol is burned the flame impinges against the under side of the panel. In the test the ethanol is ignited and allowed to burn out and the degree of burning of the panel and amount of intumescence are observed during burning and also when burning is finished.

The present invention provides a normally liquid, moisture-curing coating material or vehicle which when applied to a flammable building material or other combustible substrate, especially wood, imparts thereto outstanding resistance to burning in terms of flame spread and fuel contributed. The coatings have these properties as a result of a selection of the ingredients of the vehicle which also serve at least in substantial part to provide desirable fire retardant properties through intumescent action. Thus ou compositions are made by reaction of an aromatic hydrocarbon diisocyanate, a phenoxy ether diol and a polyhydoxy aliphatic ester of phosphorus as essential ingredients. The compositions may also contain other materials in reacted or unreacted form and an example of the former is an aliphatic polyol, e.g., polyhydric alkanol, as described below. The compositions of the present invention not only exhibit intumescence, but in addition, they do not contribute to burning, rather they serve to prevent the spread of flames and in effect extinguish the burning of the substrate.

One ingredient of the coating composition of the present invention is an aromatic hydrocarbon diisocyanate and one or more of a variety of diisocyanates may be employed. The isocyanates may be substituted with non-interfering groups, such as aliphatic hydrocarbon radicals, e.g. lower alkyl groups. Suitable diisocyanates include 2,6-tolylene diisocyanate, 2,4-tolylene diisocyanate, p-phenylene diisocyanate, p,p'-diphenylmethane diisocyanate, 1,5-naphthylene diisocyanate, substituted aromatic diisocyanates, etc. The hydrocarbon portion of the diisocyanate has at least about 6 carbon atoms and usually does not have more than about 24 carbon atoms. Aromatic diisocyanates of 6 to 12 carbon atoms in the hydrocarbon group are preferred. The amount of diisocyanate component employed is such as to give a ratio of isocyanate groups to hydroxyl radicals in the reaction mixture of about 1.5 to 2.5:1, preferably about 1.8 to 2.2:1, based on the total of the diisocyanate, phenoxy ether diol, polyhydroxy aliphatic ester of phosphorus and other polyol reactant if any of the latter be present. The reaction mixture contains an excess of isocyanate groups sufficient to provide a moisture-curing vehicle. The isocyanate groups in the vehicle, aside from any unreacted diisocyanate present, are generally at least about 0.1 weight percent of the composition, e.g., up to about 15% with about 3 to 10% being preferred.

The second essential component of the fire retardant and intumescent coating composition of the present invention is a phenoxy ether diol, preferably a polyhalo-substituted phenoxy ether diol. These preferred materials can be made, for example, from chlorodihydroxy alkanols through reaction with a suitable sodium polyhalophenate.

The phenoxy ether diols can be represented by the formula:

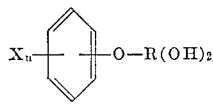

in which X is halogen having an atomic number from 17 to 35, that is, chlorine or bromine and $n$ is a number from 0 to 5, preferably 2 or even 3 to 5. Also in the formula, R is a divalent alkyl, including cycloalkyl, radical of 3 to 12 carbon atoms, preferably 3 to 6 carbon atoms. The preferred polyhalophenoxy ether diol is pentachlorophenoxy glyceryl ether which has the structure

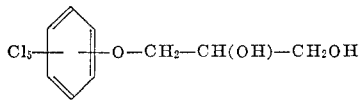

however, other suitable and similar materials may be employed. The phenyl group of these compounds may be substituted, e.g. with lower alkyl groups, and the compounds may also contain other non-interfering substituents. It is preferred that the two illustrated hydroxy groups of this reactant be attached to separate secondary and primary carbon atoms. Also the alkyl radical R may have its carbon-to-carbon chain interrupted as with one or more oxygen atoms. Representative reagents of this type include, for instance, phenoxyglyceryl ether, 2,4,6-trichlorophenoxyglyceryl ether, 1-tetrabromotoloxy-3,4-dihydroxy butane, 1 - pentachlorophenoxy-2,6-dihydroxyhexane, etc.

The other essential reactant employed in making the polyurethane-type reaction product of the present invention is a polyhydroxy aliphatic ester of phosphorus, that is, the phosphates and phosphonates. The total number of carbon atoms in the three aliphatic groups of the ester is at least 3 and often does not exceed about 24, preferably not more than 18 with no one aliphatic group containing more than about 8 carbon atoms. The aliphatic radicals are often saturated and may be substituted, even with elements such as nitrogen and oxygen that interrupt the carbon chain. The polyol phosphorus esters may contain more than two hydroxyl groups but the diols are preferred.

Among the polyol esters of phosphorus which are useful in our invention are the phosphates and phosphonates of the formula:

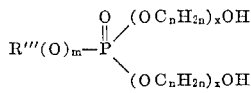

wherein $m$ is 0 to 1, $n$ is 2 to 6, especially 2 to 3, $x$ is 1 to 10, preferably 1 to 3, and R''' is an aliphatic, including cycloaliphatic hydrocarbon radical, for instance of 1 to 8 carbon atoms, and is preferably lower alkyl. R''' may be saturated or unsaturated and substituted but the compound is dissimilar to the haloalkylphosphate component of our compositions. Illustrative of these materials are di(trioxypropylene)-methyl phosphonate,

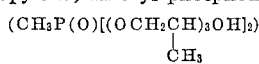

di[oxypropylene]butyl phosphate,

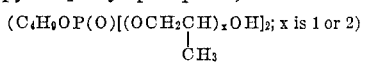

di[trioxyethylene]hydroxymethyl phosphonate $$(HOCH_2—P(O)[(OCH_2CH_2)_3OH]_2)$$

etc.

Diol phosphorus esters having one or more nitrogen atoms interrupting the carbon to carbon chain extending directly between terminal $CH_2OH$ groups, can also be employed in this invention to provide the fire resistant and intumescent coatings. Thus, the diol may have the formula:

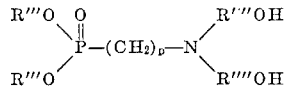

wherein $p$ is 1 to 4, R''' is as defined in the immediately preceding paragraph, and R'''' is a divalent radical of the same types as disclosed for R''', preferably lower alkylene, but with the OH groups shown. Compounds which exemplify this type of diol include O,O-diethyl-N,N-bis (2-hydroxyethyl)aminomethyl phosphonate, $$(C_2H_5O)_2P(O)CH_2N(C_2H_4OH)_2$$

The amounts of phenoxy diol and polyhydroxy aliphatic ester of phosphorus in the reaction products are usually such as to give a weight ratio of these ingredients of about 1:10 to 10:1. Often these ratios are about 1:3 to 3:1, with ratios of the phenoxy diol to the phosphorus ester of about 1.3 to 3:1 being a preferred form. Approximately equal molar ratios of these ingredients are also advantageous.

Another reactant which may, if desired, be employed in making the polyurethane-type reaction product of the present invention is an aliphatic polyol, e.g. polyhydric alkanol. This alcohol has at least 2 carbon atoms, and among the wide variety of such materials which can be used are those represented by the formula:

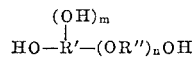

in which R' is an aliphatic hydrocarbon radical, preferably saturated, and R'' is an alkylene radical of 2 to 4, preferably 2 to 3 carbon atoms, R' generally has 2 to 12, preferably 2 to 6 carbon atoms. The letter $n$ represents a number from 0 to about 50, preferably 2 to 30, for more flexible coatings, while the letter $m$ is 0 to 1, preferably 0. When $n$ is other than a zero, R' will often be the same as R''. The aliphatic polyol reactant can be substituted with non-deleterious substituents and the lower molecular weight polyether glycols, e.g. of 2 to 4 ethylene oxide units, are preferred reactant materials.

The amounts of phenoxy diol and aliphatic polyol in the reaction product, when the latter is used, are usually such as to give a weight ratio of these ingredients of about 1:10 to 10:1, but of course none or very small amounts of the aliphatic polyol may be present. The ratios of phenoxy diol to aliphatic polyol may be about 1:3 to 3:1, with ratios of the phenoxy diol to the aliphatic polyol of about 1.5 to 3:1 being useful. Approximately equal molar ratios of these ingredients may also be employed.

Suitable aliphatic polyols include ethylene glycol, polyethylene glycols, for instance, of up to about 2000 molecular weight, propylene glycol, polypropylene glycols, for instance, of up to about 2500 molecular weight, trimethylol propane, trimethylol ethane, 1,6-hexamethylene glycol, 1,2,6-hexanetriol, etc. The aliphatic polyols of essentially dihydroxy functionality, i.e., where $m$ is 0, are preferred. Moreover, it is further preferred that the diol bear essentially no active hydrogen atoms other than those of the two hydroxy groups.

The normally liquid polyurethane-type reaction product of the present invention can be made by simultaneous reaction of the diisocyanate, phenoxy ether diol, polyhydroxy phosphorus ester and aliphatic polyol. Alternatively, the diisocyanate can be reacted with part of one or more or all of one or two of the phenoxy ether diol, polyhydroxy phosphorus ester and aliphatic polyol prior to reaction with the remaining portion of these materials. Stepwise mixing of the diisocyanate with the ether diol, polyhydroxy phosphorus ester and aliphatic polyol is preferred to enhance temperature control. The reaction temperatures are often in the range of about 60 to 120° C., with about 90 to 110° C. being preferred; and the reaction is preferably continued until there is essentially little, if any, unreacted hydroxyl functionality remaining.

The reaction product of the present invention is commonly prepared in the presence of an essentially inert solvent. The solvent serves to insure that the reactants are in the liquid state and the solvent enables better temperature control during the reaction by serving as a heat sink and, if desired, as a refluxing medium. Various solvents including mixtures of such materials may be employed and among the useful solvents are aromatic hydrocarbons, esters, ethers, ester-ketones, chlorinated hydrocarbons, etc. Frequently, the solvents are volatile materials which will be removed from the composition while it cures as a coating or film and in such case, there may be no need to remove any portion of the solvent from the reaction product prior to application as a coating. The solvent may be a relatively non-volatile material and may be selected with a view to improving the fire retardant properties of the coating, for instance, when chlorinated hydrocarbons are used. If the solvent is to be removed from the reaction product before it is applied as a film, the removal should be done in the absence of significant moisture, since moisture causes curing of the composition. The amount of solvent employed may vary widely and large volumes may be uneconomic or give materials with undesirably or inconveniently low viscosity. The amount of solvent may be selected in order to provide a reaction product of film application viscosity, but products of greater viscosity can be cut-back before use. Often we use about 0.25 to 6 weights of solvent, preferably about 0.5 to 3 weights of solvent, per weight of the total isocyanate, phenoxy ether diol, polyhydroxy phosphorus ester and aliphatic polyol. Among the suitable normally liquid solvents are xylene, ethylene glycol ethyl ether acetate, 1,1,1-trichloroethane, dimethylformamide, dimethylsulfone, dioxane, etc. and their mixtures; and we prefer that the solvent not contain more than about 10 carbon atoms per molecule.

The compositions of the present invention can have additional ingredients which impart desirable properties, i.e. the compositions have additive susceptibility. Thus, the fire retardant and intumescent characterisics are enhanced by the presence of haloalkyl phosphates, preferably tris(haloalkyl)phosphates. The halogen component of the phosphate has an atomic number from 17 to 35, that is chlorine or bromine, and preferably the alkyl is monohalosubstituted. Chlorine is the preferred halogen. The alkyl, including cycloalkyl, groups are preferably lower alkyl radicals and in general, alkyls of a lesser number of carbon atoms, e.g., 2 or 3 are preferred, as they have lower fuel and smoke potential. The amount of haloalkyl phosphate in the composition is sufficient to have the desired effect and is often about 20 to 60, preferably about 25 to 50 weight percent on the basis of the diisocyanate, phenoxy diol, polyhydroxy phosphorus ester and aliphatic polyol combination and the haloalkyl phosphate. If desired, the phosphate can be added to the composition before or after reaction of the diisocyanate, phenoxy ether idol, polyhydroxy phosphorus ester and aliphatic polyol, but preferably the addition is after the reaction.

In order to further enhance the fire retardant and intumescent characteristics of the haloalkyl phosphate-containing coating composition of the present invention we can include an effective amount of a lower alkylene diamine tetraacetic acid. The alkylene members may have 2 to 4 carbon atoms, and we prefer to use ethylene diamine tetraacetic acid. When the diamine is employed along with the haloalkyl phosphate, products of most outstanding fire retardant and intumescent characteristics are produced. In general, the coating composition will contain about 20 to 60 weight percent of the alkylene diamine tetraacetic acid, preferably the amount is about 25 to 50 weight percent, on the basis of the polymer composed of diisocyanate, phenoxy ether diol, polyhydroxy ester of phosphorus and aliphatic polyol, and the alkylene diamine tetraacetic acid.

The diamine may not be soluble in the coating composition to the extent of diamine present and it is therefore desirable to add the diamine as a finely divided material and disperse it throughout the composition. The compositions of the present invention which contain water-soluble forms of the lower alkylene tetraacetic acid, for instance, ethylene diamine tetraacetic acid when applied as coatings may be sensitive to water contact as would occur during washing or use in a humid atmosphere. To counteract this possible difficulty, we prefer that the flammable substrate for the coating be covered with the fire resistant and intumescent composition which contains both the halogenated alkyl phosphate and the lower alkylene diamine tetraacetic acid and then cover such film with a similar coating material in which the latter component is omitted. The resulting films are resistant to water leaching and show good hardness and excellent fire retardance and intumescence.

Our coating compositions are normally applied to substrates as films of less than 10 mils thickness and can contain other additives to impart special properties such as plasticizers, etc. Also, the substrate for the coating may be specially treated materials, including flammable members impregnated with fire-resistant chemicals or coated with a sealant.

The following examples will serve to illustrate the present invention but should not be considered limiting. In the examples an equivalent amount of phenyl glyceryl ether may replace the pentachlorophenyl glyceryl ether.

EXAMPLE 1

Two hundred twenty-five grams (0.67 equivalent) of pentachlorophenyl glyceryl ether, 117 grams (0.67 equivalent) of di[oxypropylene]butyl phosphate, 53 grams of ethylene glycol ethyl ether acetate and 124 grams of xylene were charged to a glass flask provided with thermometer, reflux condenser, water trap, stirrer, glass mantel heater and inlet for gaseous nitrogen. This mixture was heated for 2 hours at about 130° C. during which solvent and water were distilled over by the azeotrope process. When the mixture was dry, as judged by no more water distilling over, the temperature was lowered to about 28° C. and 235 grams (2.68 equivalents) of tolylene diisocyanate (80 percent 2,4 isomer and 20 percent 2,6 isomer) added to the flask. An exotherm occurred rapidly while stirring with the temperature rising to 35° C. The temperature was then raised by the application of heat to about 100° C. where it was kept for 6½ hours. After cooling the batch to room temperature, the product analyzed 7.11 percent NCO, 4.37 percent free tolylene diisocyanate, 62.2 percent nonvolatile, 8 minus Gardner color and H Gardner viscosity.

This vehicle when catalyzed with 1 percent N-cocomorpholine based on nonvolatile material dried in 3 hours giving a film possessing fair flexibility. When one percent of N-cocomorpholine based on solids and ½ part by weight of tris(2-chloroethyl)phosphate per part of solids of this vehicle were added to this vehicle, it dried in 5½ hours giving a fairly flexible film. When these same ingredients were added to the base vehicle along with ½ part of ethylene diamine tetraacetic acid per part of solids, the resulting vehicle dried in 7 hours giving a film possessing a fair degree of flexibility. Sward hardness for the dried films of these three vehicles were, respectively, 64, 20 and 22.

The base vehicle itself when coated on birch plywood at about 6 mils dry film showed some fire retardance and intumescence. When ½ part by weight of tris(2-chloroethyl)phosphate was dissolved in the base vehicle and the resulting mixture was coated on birch plywood at about 6 mils dry film, intumescence and fire retardance were improved to fair. When this amount of phosphate ester and ½ part by weight of ethylene diamine tetraacetic acid per part of vehicle solids was stirred into the mixture and coated on birch plywood at about 6 mils dry film, both intumescence and fire retardance were excellent.

EXAMPLE 2

The following chemicals were charged to a glass reaction flask equipped with a reflux condenser, water trap, thermometer, stirrer, heating mantel and inlet for nitrogen:

167 grams (0.5 equivalent) of a 55.5 percent solution of pentachlorophenoxy glyceryl ether in xylene
107 grams (0.84 equivalent) O,O-diethyl-N,N-bis (2-hydroxyethyl)aminomethyl phosphonate
53 grams ethylene glycol ethyl ether acetate
124 grams xylene This mixture was heated for two hours to azeotrope off water and dry it. After drying and cooling to room temperature, 235 grams (2.68 equivalents) of tolylene diisocyanate (80 percent 2,4 and 20 percent 2,6 isomer) were added to the batch. The temperature rose rapidly to 91° C. Heat was applied and the temperature raised to 100° C. where it was maintained for 2½ hours. After cooling the product was placed in cans. It analyzed 7.61 percent NCO, 7.60 percent free tolylene diisocyanate, 64.1 percent nonvolatile, 12½ Gardner color Z3+⅕ Gardner viscosity.

When one percent N-cocomorpholine catalyst based on nonvolatile was added to this vehicle, it dried in 3½ hours to a somewhat brittle film having a hardness of 54 Sward. When burned, this film showed fair fire retardance and intumescence. With this same percent of catalyst and with ½ part by weight of tris (2-chloroethyl)phosphate per part of nonvolatile added to the vehicle, it dried in 6 hours to a moderately brittle film having a Sward hardness of 27. When burned, this film exhibited fair fire retardance and intumescence. With this percent of catalyst and this percent of phosphate ester along with ½ part by weight of ethylene diamine tetraacetic acid per part of nonvolatile material the film dried in 6½ hours showing a Sward hardness of 24. When burned, this film showed excellent fire retardance and intumescence.

We claim:

1. A normally liquid, moisture-curing polymethane composition consisting essentially of the reaction product of aromatic hydrocarbon diisocyanate, ether diol of the formula:

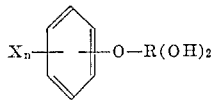

in which the two hydroxy groups are attached to separate secondary and primary carbon atoms, and in which X is halogen having an atomic number from 17 to 35, $n$ is a number from 0 to 5 and R is alkyl of 3 to 12 carbon atoms, and a polyhydroxy aliphatic ester of phosphorus having a total of about 3 to 24 carbon atoms and selected from the group consisting of phosphates and phosphonates, the amounts of said diisocyanate, ether diol and ester of phosphorus being such as to give a ratio of isocyanate to hydroxyl groups in the reaction mixture of about 1.5 to 2.5:1, and a weight ratio of ether diol to ester of phosphorus of about 1:10 to 10:1, said composition containing an amount sufficient to improve the fire retardant properties of a coating of said composition of halogen alkyl phosphate in which the halogen has an atomic number from 17 to 35, and an amount sufficient to improve the fire retardant and intumescent properties of a coating of said composition of an alkylene diamine tetraacetic acid, said alkylene group having 2 to 4 carbon atoms.

2. The composition of claim 1 in which the halogen alkyl phosphate is a tris(halogen lower alkyl) phosphate.

3. The composition of claim 2 in which the halogen lower alkyl is monochloro alkyl of 2 to 3 carbon atoms.

4. The composition of claim 3 in which the amount of halogen lower alkyl phosphate is about 25 to 50 weight percent based on the reaction product and the halogen lower alkyl phosphate.

5. The composition of claim 3 in which the alkylene diamine tetraacetic acid is ethylene diamine tetraacetic acid.

6. The composition of claim 5 in which the amount of halogen lower alkyl phosphate is about 25 to 50 weight percent based on the reaction product and the halogen lower alkyl phosphate, and the amount of ethylene diamine tetraacetic acid is about 25 to 50 weight percent based on the reaction product and the ethylene diamine tetraacetic acid.

7. The composition of claim 6 in which the halogen lower alkyl phosphate is tris(chloroethyl)phosphate.

8. The composition of claim 1 in which the diisocyanate is tolylene diisocyanate.

9. The composition of claim 1 in which the alkylene diamine tetraacetic acid is ethylene diamine tetraacetic acid.

10. The composition of claim 9 in which the amount of ethylene diamine tetraacetic acid is about 25 to 50 weight percent based on the reaction product and the ethylene diamine tetraacetic acid.

11. The composition of claim 1 in which the polyhydroxy aliphatic ester of phosphorus is a diol.

12. A normally liquid, moisture-curing polyurethane composition consisting essentially of the reaction product of aromatic hydrocarbon diisocyanate, ether diol of the formula:

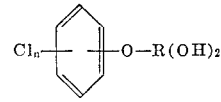

in which the two hydroxy groups are attached to separate secondary and primary carbon atoms, and in which $n$ is a number from 3 to 5 and R is alkyl of 3 to 6 carbon atoms, and a polyhydroxy aliphatic ester of phosphorus having a total of 3 to about 18 carbon atoms with no more than about 8 carbon atoms in an aliphatic group and selected from the group consisting of phosphates and phosphonates, the amounts of said diisocyanate, ether diol and ester of phosphorus being such to give a ratio of isocyanate to hydroxy groups in the reaction mixture of about 1.8 to 2.2:1, and a weight ratio of ether diol to ester of phosphorus of about 1:3 to 3:1, said composition containing an amount sufficient to improve the fire retardant properties of a coating of said composition of halogen alkyl phosphate in which the halogen has an atomic number of 17 to 35, and an amount sufficient to improve the fire retardant and intumescent properties of a coating of said composition of an alkylene diamine tetraacetic acid, said alkylene group having 2 to 4 carbon atoms.

13. The composition of claim 12 in which the diisocyanate is tolylene diisocyanate.

14. The composition of claim 13 in which the ether diol is pentachlorophenoxy glyceryl ether.

15. The composition of claim 14 in which the polyhydroxy ester of phosphorus is of the formula:

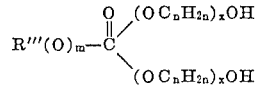

wherein $m$ is 0 to 1, $n$ is 2 to 6, and $x$ is 1 to 10 and R''' is lower alkyl.

16. The composition of claim 15 in which $m$ is 1, $n$ is 2 to 3 and $x$ is 1 to 3.

17. The composition of claim 16 in which the polyhydroxy ester of phosphorus is a di[polyoxypropylene] butyl phosphate.

18. The composition of claim 14 in which the polyhydroxy ester of phosphorus is of the formula:

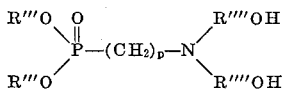

wherein $p$ is 1 to 4, R''' is lower alkyl and R'''' is lower alkylene.

19. The composition of claim 18 in which the polyhydroxy ester of phosphorus is O,O-diethyl-N,N-bis(2-hydroxyethyl)aminomethyl phosphonate.

20. A normally liquid, moisture-curing polyurethane composition consisting essentially of the reaction product of tolylene diisocyanate, pentachlorophenoxy glyceryl ether, polyhydroxy aliphatic ester of phosphorus selected from the group consisting of

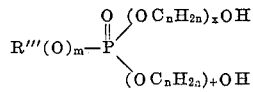

wherein $m$ is 0 to 1, $n$ is 2 to 6, $x$ is 1 to 10 and R''' is lower alkyl; and

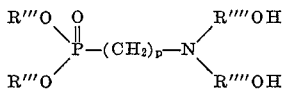

wherein $p$ is 1 to 4, R''' is lower alkyl and R'''' is lower alkylene, the amounts of tolylene diisocyanate, glyceryl ether and polyhydroxy aliphatic ester of phosphorus being such to give a ratio of isocyanate to hydroxy groups in the reaction mixture of about 1.8 to 2.2:1, and a weight ratio of ether diol to ester of phosphorus of about 1:3 to 3:1, said composition containing a tris(monochloroalkyl) phosphate of 2 to 3 carbon atoms in said alkyl in an amount of about 20 to 60 weight percent based on said reaction product and tris(monochloroalkyl) phosphate, and ethylene diamine tetraacetic acid in an amount of about 20 to 60 weight percent based on said reaction product and said ethylene diamine tetraacetic acid.

21. The composition of claim 20 in which the polyhydroxy ester of phosphorus is a di[polyoxypropylene] butyl phosphate.

22. The composition of claim 20 in which the polyhydroxy ester of phosphorus is O,O-diethyl-N,N-bis(2-hydroxyethyl)aminomethyl phosphonate.

23. A normally liquid, moisture-curing polyurethane composition consisting essentially of the reaction product of aromatic hydrocarbon diisocyanate, ether diol of the formula:

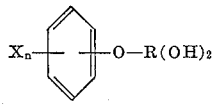

in which the two hydroxy groups are attached to separate secondary and primary carbon atoms, and in which X is halogen having an atomic number from 17 to 35, $n$ is a number from 3 to 5 and R is alkyl of 3 to 12 carbon atoms, and a polyhydroxy aliphatic ester of phosphorus selected from the group consisting of

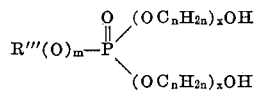

wherein $m$ is 0 to 1, $n$ is 2 to 6, $x$ is 1 to 10 and R''' is an aliphatic hydrocarbon radical of 1 to 8 carbon atoms; and

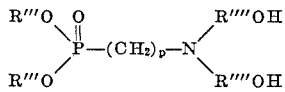

wherein $p$ is 1 to 4, R''' and R'''' are aliphatic hydrocarbon radicals of 1 to 8 carbon atoms, the amounts of said diisocyanate, ether diol and ester of phosphorus being such to give a ratio of isocyanate to hydroxyl groups in the reaction mixture of about 1.5 to 2.5:1, and a weight ratio of ether diol to ester of phosphorus of about 1.10 to 10:1 said composition containing an amount sufficient to improve the fire retardant properties of a coating of said composition of halogen alkyl phosphate in which the halogen has an atomic number of 17 to 35, and an amount sufficient to improve the fire retardant and intumescent properties of a coating of said composition of an alkylene diamine tetraacetic acid, said alkylene group having 2 to 4 carbon atoms.

24. The composition of claim 23 in which the halogen alkyl phosphate is a tris(halogen lower alkyl) phosphate in which the halogen has an atomic number from 17 to 35.

25. The composition of claim 24 in which the alkylene diamine tetraacetic acid is ethylene diamine tetraacetic acid.

26. The composition of claim 25 in which R''' is lower alkyl and R'''' is lower alkylene.

27. The composition of claim 26 in which the diisocyanate is tolylene diisocyanate.

28. The composition of claim 27 in which the ether diol is pentachlorophenoxy glyceryl ether.

References Cited

UNITED STATES PATENTS

| | | | |
|---|---|---|---|
| 3,004,073 | 10/1961 | Wismer et al. | 260—613 |
| 3,102,875 | 9/1963 | Heiss | 260—77.5 |
| 3,171,819 | 3/1965 | Powanda | 260—45.7 |
| 3,220,961 | 11/1965 | Friedman | 260—77.5 |
| 3,235,517 | 2/1966 | Beck et al. | 260—77.5 |
| 3,284,404 | 11/1966 | Schollenberger et al. | 260—45.85 |

OTHER REFERENCES

Saunders et al., Polyurethanes Chemistry & Technology, Part II, Technology, Interscience Publishers, N.Y., 1964, pp. 462 and 463.

DONALD E. CZAJA, Primary Examiner

M. J. WELSH, Assistant Examiner

UNITED STATES PATENT OFFICE
CERTIFICATE OF CORRECTION

Patent No. 3,525,708                    Dated August 25, 1970

Inventor(s) Charles C. Clark and Arthur J. Krawczyk

It is certified that error appears in the above-identified patent and that said Letters Patent are hereby corrected as shown below:

Column 2, line 27, "ou" should be --our--.

Column 2, line 29, "polyhydoxy" should be --polyhydroxy--.

Column 5, line 59, "idol" should be --diol--.

Column 7, line 45, "polymethane" should be --polyurethane--.

Column 8, line 65 in the formula, $\overset{\text{"O"}}{\underset{}{C}}$ should be $\overset{O}{\underset{}{P}}$.

Column 9, line 20 in the formula, "+" should be --x--.

Column 10, line 20, "1.10" should be --1:10--.

SIGNED AND
SEALED
DEC 29 1970

(SEAL)
Attest:

Edward M. Fletcher, Jr.
Attesting Officer

WILLIAM E. SCHUYLER, JR.
Commissioner of Patents